United States Patent Office 3,076,726
Patented Feb. 5, 1963

3,076,726
SILOXANE COATING METHOD AND ARTICLE OBTAINED THEREFROM
Lawrence H. Ault and Lynn Salisbury, Midland, Mich., assignors to Dow Corning Corporation, Midland, Mich., a corporation of Michigan
No Drawing. Filed May 23, 1960, Ser. No. 30,734
9 Claims. (Cl. 117—155)

This invention relates to improved methylpolysiloxane coatings which are particularly useful for purposes of release.

The use of cured methylpolysiloxane rubbery films for release applications has obtained wide acceptance in industry. These coatings may be employed on a wide variety of materials ranging from paper to metals and ceramics. They are employed for release of adhesives as, for example, on the interleaving sheets of adhesive tapes, for the treating of paper containers for sticky materials such as rubber or asphalt, for the coating of the inside of containers such as the holds of ships, tank cars or pipes on which solid materials deposit from an aqueous phase and for the treating of the superstructure of ships for the release of ice. In many instances the cured methylpolysiloxanes have opened up whole new areas of release applications.

However, the heretofore employed methylpolysiloxane release agents have suffered from the disadvantage of excessive removal of the cured film from the base member surface when subject to abrasion. This phenomenon is not a problem in many applications but in others where abrasion is substantial, it does pose a serious problem. This abrasion is due in part to the relatively low cohesive strength of the release coatings and in part to the fact that there is less adhesion to the base member than is often desired. This combination of factors often causes excessive abrasion of the film during use. This results in bare spots on the base member with attendant sticking.

It is the object of this invention to reduce or prevent abrasion of siloxane release films, to give superior release coatings and to provide superior release for a wide number of applications. Other objects and advantages will be apparent from the following description.

This invention relates to a method of coating base members which comprises applying to the base member a mixture of (1) a siloxane having a viscosity of at least 100 cs. at 25° C., said siloxane being composed principally of siloxane of the formula $$Me_xSiO_{\frac{4-x}{2}}$$

in which $x$ has an average value from 1.9 to 2, in said siloxane essentially all of the molecules contain at least 2 groups selected from the group consisting of silicon-bonded hydroxyl and methoxyl groups, said siloxane (1) containing from .1 to less than 5% by weight methylhydrogensiloxane and (2) from 1 to 10% by weight based on (1) of a silane of the formula

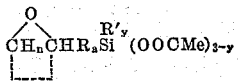

in which $n$ has a value from 1 to 2, $n$ being 1 when the

form of ether linkages and divalent radicals composed of carbon, hydrogen and oxygen in the form of carboxylic acid ester linkages, the total number of carbon and oxygen atoms in R being less than 15, $a$ has a value from 0 to 1, R' is an aliphatic hydrocarbon radical of less than 6 carbon atoms and $y$ has an average value from 0 to 1 inclusive, and thereafter curing the coating.

The mixture of (1) and (2) can be applied to the base member in any suitable manner such as by brushing, dipping, spraying or roller coating. When siloxane (1) is a relatively low viscosity fluid, the material can be applied to the base member as such. However, when siloxane (1) is a viscous material, it is highly desirable to dilute the mixture with an inert organic solvent such as hydrocarbons such as benzene, toluene, xylene or aliphatic petroleum hydrocarbons or with halogenated hydrocarbons such as perchloroethylene or chlorobenpene or with ethers such as ethylether or dibutylether.

After the mixture has been applied to the base member it is thereafter cured in any convenient manner. This can be done by heat alone particularly in those cases where the base member is thermally stable or it may be done by subjecting the coating to ionizing radiation such as X-rays, gamma rays or high speed electrons or the curing may be enhanced by the addition of a chemical curing catalyst. These catalysts can be any of the commonly employed catalysts for siloxane systems containing SiH groups such as, for example, salts of carboxylic acids such as dibutyltindiacetate, ferric octoate, lead 2-ethylhexoate and manganese octoate or amines such as ethylene diamine or hexylamine. The presence of the catalyst reduces the temperature required for cure. Thus, the presence of the catalyst is particularly advantageous when coating thermally unstable base members such as paper or other organic fabrics.

The coatings of this invention can be employed with any base member such as organic materials such as paper, cellulose, nylon, polyester resins, styrene or other organic plastics or wood; or inorganic materials such as ceramics or metals such as aluminum, magnesium, copper, steel or zinc.

Siloxane (1) employed in this invention can be any methylpolysiloxane having an average of from 1.9 to 2 methyl groups per silicon. This polymer can range in viscosity from 100 cs. at 25° C. up to non-flowing benzene soluble gums. For the purpose of this invention it is essential that essentially all of the molecules in the methylsiloxane have at least two hydroxyl and/or methoxyl groups per molecule. These are the reactive groups which interact with the SiH groups of the methylhydrogensiloxane to produce at least part of the curing of the coating. Siloxanes of the above type can be prepared by the hydrolysis of methylchlorosilanes or by the partial hydrolysis of methylmethoxysilanes.

The term "essentially all" as used in conjunction with siloxane (1) means that there is less than 10% by weight molecules containing no hydroxyl or methoxyl groups. These impurities are normally present in commercial hydroxylated siloxanes.

It is essential to the process of this invention that siloxane (1) contain from .1 to less than 5% by weight of methylhydrogensiloxane. This methylhydrogensiloxane can either be a material in which each unit has the formula MeHSiO or it can be in the form of trimethylsiloxy endblocked methylhydrogensiloxane.

The essential improvement of this invention resides in the use of from 1 to 10% by weight based on the weight of (1) of silane (2). It is essential for the purpose of this invention that silane (2) contain both the epoxy group group comprises a cycloaliphatic ring, R is of the group consisting of divalent hydrocarbon radicals, divalent radicals composed of carbon, hydrogen and oxygen in the and the acetoxy group attached to the silicon. When less than 1% of (2) is employed, the improved abrasion resistance is not obtained. Inferior results are obtained when more than 10% of the silane (2) is employed.

Silane (2) is best prepared by one of two methods. One is that of reacting an unsaturated epoxide of the formula

with a silane of the formula

in the presence of a platinum catalyst at a temperature above 50° C. Chloroplatinic acid is an excellent catalyst for this reaction and generally the reaction proceeds spontaneously upon mixing the epoxide, the silane and the catalyst. If necessary, warming to 0 to 120° C. may be employed to initiate or to complete the reaction. During the reaction the addition of the unsaturated linkage in the epoxide to the SiH compound occurs to give the silane (2).

A second method which is employed when $a$ is 0 or when R is an aromatic hydrocarbon radical is that of first forming a silane having an unsaturated group attached to the silicon and then oxidizing the carbon-carbon double bond with a peracid such as peracetic acid. This reaction is best carried out at temperatures of from 30 to 50° C. For example, one can react vinyltriacetoxysilane with peracetic acid to produce the epoxy silane of the formula

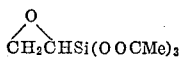

or one may react styryl methyldiacetoxysilane with peracetic acid to produce the epoxide

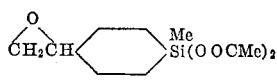

This method can be controlled so that in those cases where there are two alkenyl groups attached to the silicon one can oxidize only one of these groups. This is best accomplished by employing one mol or less of peracetic acid per mol of silane. Thus, for example, one can react 1 mol of peracetic acid with 1 mol of divinyldiacetoxysilane to obtain

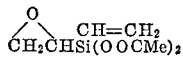

In carrying out the process of this invention it is best to mix the acetoxysilane with (1) within one day or less before use of the mixture. This will prevent any premature gelation of the mixture prior to coating.

For the purpose of this invention R can be any divalent hydrocarbon radical of less than 15 carbon atoms such as methylene, ethylene, propylene, butylene, decylene, phenylene, xenylene, cyclohexylene, cyclopentylene, methylcyclohexylene and tolylene. R can also be any divalent ether radical such as —CH₂CH₂OCH₂CH₂—,

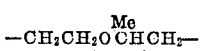

—CH₂(OC₂H₄)₄O(CH₂)₃—, —CH₂OC₂H₄OC₂H₄— and —CH₂OCH₂CH=CH₂—. R can also contain a divalent ester linkage derived from a carboxylic acid such as —CH₂OOCCH₂CH₂—, —CH₂OOC(CH₂)₆,

and —CH₂(OC₃H₆)₂OOCCH₂CH₂—.

R′ can be any aliphatic hydrocarbon radical of less than 6 carbon atoms such as methyl, ethyl, propyl, butyl, amyl, vinyl, allyl or pentenyl.

The following examples are illustrative only and should not be construed as limiting the invention which is properly delineated in the appended claims.

In the claims and the specification the following abbreviations are employed: Me for methyl, Et for ethyl, Pr for propyl and Bu for butyl.

In evaluating the effectiveness of the coatings of this invention to give proper release and to withstand abrasion the following tests were employed.

The release was determined by applying a one inch wide strip of Johnson and Johnson surgical adhesive tape to the coated surface and subjecting the tape to a pressure of .25 pound per square inch for 20 hours at 70° C. The tape was then pulled away from the surface at an angle of 180° at a rate of 12 inches per minute. The force necessary to do this measured in grams was recorded in grams per inch of width. By way of comparison the tape generally requires about 500 grams per inch of width to pull it from a non-treated surface.

When the base member is paper or other fabric, the abrasion resistance of the cured films was determined by pulling a 4 pound rubber rimmed wheel one inch wide across the coated surface under conditions which would not allow the wheel to rotate. This was done ten times and the abraded area was then smeared with a water solution of a midnight blue dye. The depth of color which developed in the abraded area was directly proportional to the amount of abrasion. This depth of color was evaluated visually and where there has been no abrasion practically no color develops because the dye does not wet the base member due to the water repellent nature of the silicone film.

*Example 1*

A mixture (1) of 97% by weight of a hydroxyl endblocked dimethylpolysiloxane gum and 3% by weight of a trimethylsiloxy endblocked methylhydrogenpolysiloxane was dissolved in a mixture of xylene and Skelly solvent "D" to give a 10% solution of the siloxane solids. To this solution was then added 6% by weight based on the weight of siloxane solids of dibutyltindi-2-ethylhexoate and the varying percentages shown below of the silane

The solution was coated onto glassine paper and the paper was then cured 2 minutes at 250° F. The resulting paper contained .8 pound of total siloxane coating per 3000 square feet of surface.

| Percent silane based on the wt. of (1)— | Release immediately after curing in g. per inch of width | Abrasion resistance immediately after cure |
| --- | --- | --- |
| 1 | 10 to 30 | Poor. |
| 2 | 10 to 30 | Fair. |
| 3 | 20 to 30 | Good. |

This example shows the criticality of the lower limit of 1%.

*Example 2*

A mixture of 33 parts of a 27% solution of siloxane (1) of Example 1, 66 parts of an aliphatic hydrocarbon solvent, .3 part of dibutyltindi-2-ethylhexoate and .5 part of the silane

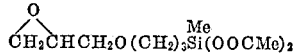

was applied to glassine paper and the paper thereafter cured 2 minutes at 250° C. The release characteristics and abrasion resistance of the siloxane coating was then tested as shown below.

| | Release in g. per inch of width | | | Abrasion Resistance | | | |
|---|---|---|---|---|---|---|---|
| | 0 hours | 3 days | 14 days | 0 hours | 3 days | 7 days | 14 days |
| Coated paper | 20 | 15 | 20 | Good | Very Good | Excellent | Excellent. |
| Blank | 30 | 15 | 20 | Poor | Poor | Poor | Poor. |

*Example 3*

The silane

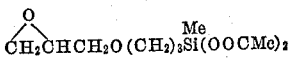

was added to a 10% xylene-Skelly solvent "D" solution of siloxane (1) of Example 1 in amount so that there was 5% by weight of the acetoxysilane based on the weight of (1). Diethylene triamine was then added to the solution in amount of 10% amine based on the weight of the acetoxy silane. The solution was then employed to coat aluminum panels and the panels were thereafter cured 2 minutes at 250° C. and then aged 4 days at room temperature. The abrasion resistance of the coatings was then measured by rubbing a pencil eraser over the surface by hand. The number of strokes required to visually remove the coating was recorded. The experiment was repeated except that the panels were not cured 2 minutes at 250° F. but were merely allowed to age for 4 days at room temperature. The results were as follows.

Sample: No. of cyles
Blank _____ 12
Cured 250° F. _____ >200
Room temperature cure _____ 130
Blank _____ 10

*Example 4*

Improved abrasion resistance is obtained when a solution of a mixture of (1) 97% by weight of a methoxy endblocked dimethylpolysiloxane of 100,000 cs. and 3% by weight of methylhydrogensiloxane, (2) 5% by weight of

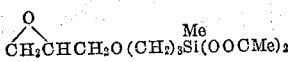

based on the weight of (1) and 5% by weight dibutyltindiacetate based on the weight of (1) is employed to coat kraft paper and the resulting coating is cured 2 minutes at 250° F.

*Example 5*

Equivalent results are obtained when the following epoxy silanes are employed in the procedure of Example 2:

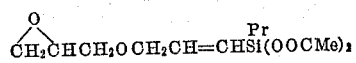

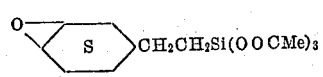

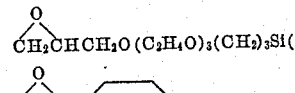

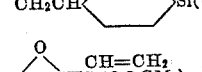

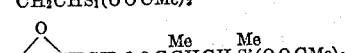

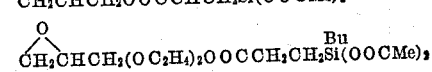

That which is claimed is:

1. The method comprising applying to a base member a mixture of (1) a siloxane having a viscosity of at least 100 cs. at 25° C. and being composed principally of siloxane of the formula

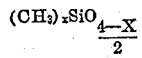

in which $x$ has an average value from 1.9 to 2 inclusive, in said siloxane essentially all of the molecules contain at least two silicon-bonded radicals of the group consisting of hydroxyl and methoxyl radicals, said siloxane containing from .1 to less than 5% by weight methylhdrogensiloxane and (2) from 1 to 10% by weight based on the weight of (1) of a silane of the formula

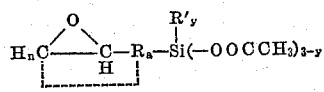

in which $n$ has a value from 1 to 2 inclusive, $n$ being 1 when the

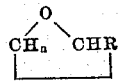

group comprises a cycloaliphatic ring, R is selected from the group consisting of divalent hydrocarbon radicals and divalent radicals composed of carbon, hydrogen and oxygen, the latter being in the form of linkages selected from the group consisting of ether linkages and carboxylic ester linkages, the total C and O atoms in R being less than 15, $a$ has a value from 0 to 1 inclusive, R' is an aliphatic hydrocarbon radical of less than 6 C atoms and $y$ has an average value from 0 to 1 inclusive, and thereafter curing the siloxane coating.

2. A method comprising coating a base member with a mixture of (1) a hydroxyl endblocked dimethylpolysiloxane having a viscosity of at least 100 cs. at 25° C., said siloxane containing from .1 to less than 5% by weight methylhydrogensiloxane and (2) from 1 to 10% by weight based on the weight of (1) of

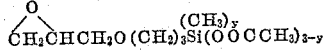

in which $y$ has a value from 0 to 1 inclusive, and thereafter curing the coating.

3. A method comprising coating a base member with a mixture of (1) a hydroxyl endblocked dimethylpolysiloxane having a viscosity of at least 100 cs. at 25° C., said siloxane containing from .1 to less than 5 percent by weight methylhydrogenpolysiloxane and (2) from 1 to 10 percent by weight based on the weight of (1) of

and thereafter curing the coating.

4. An article of manufacture comprising a base member coated with a cured mixture of (1) a siloxane having a viscosity of at least 100 cs. at 25° C. and being composed principally of siloxane of the formula

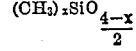

in which $x$ has an average value from 1.9 to 2 inclusive, in said siloxane essentially all of the molecules containing at least 2 silicon-bonded radicals selected from the group consisting of hydroxyl and methoxyl radicals, said siloxane containing from .1 to less than 5 percent by weight methylhydrogensiloxane and (2) from 1 to 10 percent by weight based on the weight of (1) of a silane of the formula

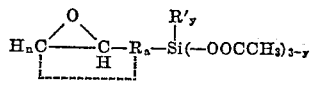

in which $n$ has a value of from 1 to 2 inclusive, $n$ being 1 when the

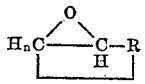

group comprises a cycloaliphatic ring, R is selected from the group consisting of divalent hydrocarbon radials and divalent radicals composed of carbon, hydrogen and oxygen, the latter being in the form of linkages selected from the group consisting of ether linkages and carboxylic ester linkages, the total C and O atoms in R being less than 15, $a$ has a value from 0 to 1 inclusive, R' is an aliphatic hydrocarbon radical of less than 6 C atoms and $y$ has an average value from 0 to 1 inclusive.

5. An article of manufacture comprising paper coated with a cured mixture of (1) a siloxane having a viscosity of at least 100 cs. at 25° C. and being composed principally of siloxane of the formula $$(CH_3)_xSiO_{\frac{4-x}{2}}$$

in which $x$ has an average value from 1.9 to 2 inclusive, in said siloxane essentially all of the molecules containing at least 2 silicon-bonded radicals selected from the group consisting of hydroxyl and methoxyl radicals, said siloxane containing from .1 to less than 5 percent by weight methylhydrogensiloxane and (2) from 1 to 10 percent by weight based on the weight of (1) of a silane of the formula

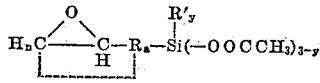

in which $n$ has a value of from 1 to 2 inclusive, $n$ being 1 when the

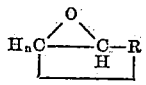

group comprises a cycloaliphatic ring, R is selected from the group consisting of divalent hydrocarbon radicals and divalent radicals composed of carbon, hydrogen and oxygen, the latter being in the form of linkages selected from the group consisting of ether linkages and carboxylic ester linkages, the total C and O atoms in R being less than 15, $a$ has a value from 0 to 1 inclusive, R' is an aliphatic hydrocarbon radical of less than 6 C atoms and $y$ has an average value from 0 to 1 inclusive.

6. An article of manufacture comprising a base member coated with a cured mixture of (1) a hydroxyl endblocked dimethylpolysiloxane having a viscosity of at least 100 cs. at 25° C., said siloxane containing from .1 to less than 5 percent by weight methylhydrogenpolysiloxane and (2) from 1 to 10 percent by weight based on the weight of (1) of

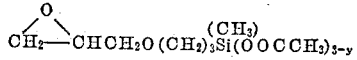

in which $y$ has a value from 0 to 1 inclusive.

7. An article of manufacture comprising paper coated with a cured mixture of (1) a hydroxyl endblocked dimethylpolysiloxane having a viscosity of at least 100 cs. at 25° C., said siloxane containing from .1 to less than 5 percent by weight methylhydrogenpolysiloxane and (2) from 1 to 10 percent by weight based on the weight of (1) of

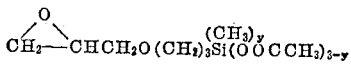

in which $y$ has a value from 0 to 1 inclusive.

8. An article of manufacture comprising a base member coated with a cured mixture of (1) a hydroxyl endblocked dimethylpolysiloxane having a viscosity of at least 100 cs. at 25° C., said siloxane containing from .1 to less than 5 percent by weight methylhydrogensiloxane and (2) from 1 to 10 percent by weight based on the weight of (1) of

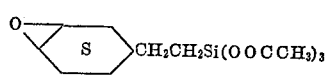

9. An article of manufacture comprising paper coated with a cured mixture of (1) a hydroxyl endblocked dimethylpolysiloxane having a viscosity of at least 100 cs. at 25° C., said siloxane containing from .1 to less than 5 percent by weight methylhydrogensiloxane and (2) from 1 to 10 percent by weight based on the weight of (1) of

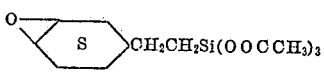

References Cited in the file of this patent
UNITED STATES PATENTS
2,732,318     Keil ------------------ Jan. 24, 1956

UNITED STATES PATENT OFFICE
CERTIFICATE OF CORRECTION

Patent No. 3,076,726                          February 5, 1963

Lawrence H. Ault et al.

It is hereby certified that error appears in the above numbered patent requiring correction and that the said Letters Patent should read as corrected below.

Column 3, line 1, beginning with "group comprises" strike out all to and including "oxygen in the" in line 3, same column 3, and insert the same after the formula at the bottom of column 1; same column 3, line 22, for "0 to 120° C." read -- 50 to 120° C. --; column 5, lines 56 and 57, the formula should appear as shown below instead of as in the patent:

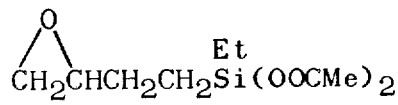

same column 5, lines 69 and 70, the formula should appear as shown below instead of as in the patent:

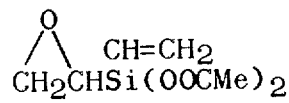

column 8, lines 15 and 16, the formula should appear as shown below instead of as in the patent:

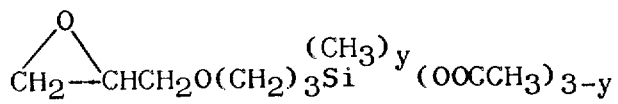

Signed and sealed this 29th day of September 1964.

(SEAL)
Attest:

ERNEST W. SWIDER                          EDWARD J. BRENNER
Attesting Officer                          Commissioner of Patents